A. HANCE.
Whiffletree.
No. 211,399. Patented Jan. 14, 1879.
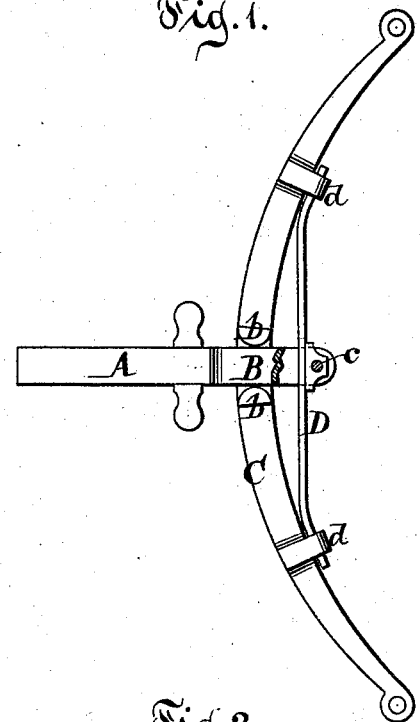
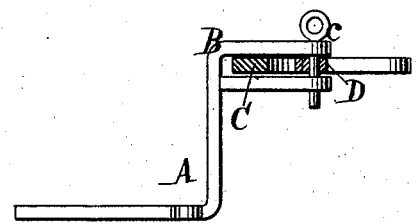
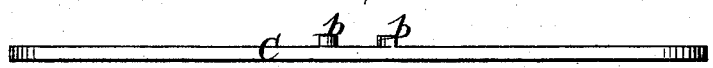
Witnesses.
Chas. Wahlers.
Wm Miller
Inventor.
Archibald Hance
by his attys.
Van Santvoord & Hauff

UNITED STATES PATENT OFFICE.

ARCHIBALD HANCE, OF NEW YORK, N. Y.

IMPROVEMENT IN WHIFFLETREES.

Specification forming part of Letters Patent No. 211,399, dated January 14, 1879; application filed December 11, 1878.

To all whom it may concern:

Be it known that I, ARCHIBALD HANCE, of the city, county, and State of New York, have invented a new and useful Improvement in Whiffletrees, which is fully described in the following specification, reference being had to the accompanying drawing, in which—

Figure 1 represents a plan view of my whiffletree. Fig. 2 is a cross-section thereof in the line of draft. Fig. 3 shows the draft-bar detached.

Similar letters indicate corresponding parts.

My invention relates to that class of whiffletrees comprising a yielding draft-bar or whiffletree proper; and it has for its object to produce an article of this character which possesses the required degree of strength and is not liable to get out of order, besides being less expensive than the devices generally employed.

It consists in the combination of a frame which is adapted to be attached to a vehicle, and constructed with an open clip, a draft-bar, which rests loosely in this clip, and is provided with stops on opposite sides of the latter, serving to prevent a lateral movement of the bar, but allowing the same to move to and fro in the clip, and a spring, which is fastened in the clip forward of the draft-bar, and which impinges upon the latter on opposite sides of the clip, so that under normal conditions the draft-bar is held back by the action of the spring, while when the bar is pulled forward by the horse in starting the vehicle the spring is bent and the bar is allowed to yield; also, in a novel arrangement of the spring.

In the drawing, the letter A designates the frame of my whiffletree, having an open clip, B. C is the draft-bar or whiffletree proper, and D is the spring.

The frame A is suitably constructed to be attached to a car or other vehicle, and the clip B opens in an outer or forward direction. The draft-bar C is fitted in the clip B and rests loosely therein, while it is provided with stops $b$ on opposite sides of the clip. These stops impinge upon the edges of the clip B, and thus prevent a lateral movement of the draft-bar; but they do not interfere with a forward or back movement thereof.

I prefer to round the stops $b$ on their inner edges, so that the draft-bar is also susceptible of oscillating.

The spring D is fastened in the clip B by a bolt, $c$, or other suitable means, and it has two branches impinging upon the draft-bar C on opposite sides of the clip. The ends of the spring D are held against the draft-bar by means of staples $d$. The spring D has a tendency to force the draft-bar C back toward the rear or closed end of the clip B, while when the bar is pulled forward the spring is bent, and the bar is allowed to yield sufficiently to assist in starting the vehicle. The bolt or coupling-pin $c$ is removable, and hence the spring D can be detached from the clip at will to allow of removing the draft-bar C; and since the staples $d$ have the effect of attaching the spring to the draft-bar, a connection is preserved between these two parts when they are removed from the clip. This is of particular advantage when my whiffletree is used on horse-cars, where the parts are very frequently uncoupled.

What I claim as new, and desire to secure by Letters Patent, is—

1. The combination, with the frame A, having the clip B, of the loose draft-bar C, having stops $b$, and of the spring D, fastened on the clip forward of the draft-bar and impinging upon the latter, substantially as described.

2. The combination, with the frame A, having the clip B, of the loose draft-bar C, having stops $b$, and of the spring D, detachably fastened in the clip forward of the latter, and attached to the draft-bar at its ends, substantially as shown and described.

In testimony whereof I have hereunto set my hand and seal this 6th day of December, A. D. 1878.

ARCHIBALD HANCE. [L. S.]

Witnesses:
E. F. KASTENHUBER,
CHAS. WAHLERS.